US011572101B2

(12) United States Patent
Ito

(10) Patent No.: US 11,572,101 B2
(45) Date of Patent: Feb. 7, 2023

(54) SUB-FRAME

(71) Applicant: HONDA MOTOR CO., LTD., Tokyo (JP)

(72) Inventor: Yuho Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/680,348

(22) Filed: Feb. 25, 2022

(65) Prior Publication Data

US 2022/0306202 A1 Sep. 29, 2022

(30) Foreign Application Priority Data

Mar. 29, 2021 (JP) .............................. JP2021-054965

(51) Int. Cl.
| | |
|---|---|
| *B62D 21/03* | (2006.01) |
| *B62D 21/04* | (2006.01) |
| *B62D 21/09* | (2006.01) |
| *B62D 25/20* | (2006.01) |
| *B62D 21/06* | (2006.01) |
| *B22D 17/22* | (2006.01) |

(52) U.S. Cl.
CPC .............. *B62D 21/03* (2013.01); *B62D 21/04* (2013.01); *B62D 21/06* (2013.01); *B62D 21/09* (2013.01); *B62D 25/20* (2013.01); *B22D 17/22* (2013.01)

(58) Field of Classification Search
CPC ........ B62D 21/06; B62D 21/11; B62D 21/03; B62D 21/09; B62D 25/20
See application file for complete search history.

(56) References Cited

U.S. PATENT DOCUMENTS

| | | | | |
|---|---|---|---|---|
| 7,976,037 | B2* | 7/2011 | Yoshida | B62D 3/12 280/124.109 |
| 9,108,681 | B2* | 8/2015 | Imanishi | B62D 29/008 |
| 10,717,468 | B2* | 7/2020 | Hara | B62D 21/152 |
| 2015/0075896 | A1* | 3/2015 | Imanishi | B62D 21/11 180/312 |
| 2016/0068189 | A1* | 3/2016 | Imanishi | B22C 9/10 296/204 |

(Continued)

FOREIGN PATENT DOCUMENTS

| | | | | | |
|---|---|---|---|---|---|
| CN | | 110667360 | A | * 1/2020 | |
| CN | | 112124431 | A | * 12/2020 | ............. B62D 21/11 |

(Continued)

*Primary Examiner* — James A English
*Assistant Examiner* — Matthew D Lee
(74) *Attorney, Agent, or Firm* — Amin, Turocy & Watson, LLP

(57) ABSTRACT

A sub-frame includes: a main body portion that has a vehicle body support portion supported by a vehicle body; and a reinforcement plate that is attached to a bottom surface of the main body portion. The main body portion includes a torque rod support portion which supports a torque rod coupled to a power unit. The torque rod support portion has a first shaft support portion which supports one end of a shaft supporting the torque rod, a first opening portion into which the torque rod is able to be inserted, and a second opening portion which is formed below the first shaft support portion. The reinforcement plate has a second shaft support portion supporting the other end of the shaft and covers the second opening portion from below.

10 Claims, 5 Drawing Sheets

(56) References Cited

U.S. PATENT DOCUMENTS

| | | | | |
|---|---|---|---|---|
| 2018/0178836 A1* | 6/2018 | Awano | ............ | B62D 29/005 |
| 2020/0307697 A1* | 10/2020 | Takahashi | ............ | B62D 21/11 |
| 2022/0177044 A1* | 6/2022 | Kondo | ............ | B62D 21/155 |
| 2022/0306201 A1* | 9/2022 | Ito | ............ | B62D 21/03 |
| 2022/0306202 A1* | 9/2022 | Ito | ............ | B62D 21/06 |
| 2022/0306203 A1* | 9/2022 | Ito | ............ | B62D 21/11 |
| 2022/0306205 A1* | 9/2022 | Ito | ............ | B62D 3/126 |

FOREIGN PATENT DOCUMENTS

| | | | | |
|---|---|---|---|---|
| DE | 102012110979 A1 * | 5/2013 | ............ | B62D 21/11 |
| DE | 102013004804 A1 * | 9/2013 | ............ | B62D 21/00 |
| DE | 102017202215 A1 * | 8/2018 | | |
| JP | 2005-059813 | 3/2005 | | |
| WO | WO-2022223894 A1 * | 10/2022 | | |

\* cited by examiner

SUB-FRAME

CROSS-REFERENCE TO RELATED APPLICATION

Priority is claimed on Japanese Patent Application No. 2021-054965, filed on Mar. 29, 2021, the contents of which are incorporated herein by reference.

BACKGROUND

Field of the Invention

The present invention relates to a sub-frame.

Background

In the related art, a suspension member fixed to a lower portion of a vehicle body is known (for example, refer to Japanese Unexamined Patent Application, First Publication No. 2005-59813).

SUMMARY

However, the suspension member described in Japanese Unexamined Patent Application, First Publication No. 2005-59813 requires a bracket supporting a torque rod connected to an engine or the like and a reinforcement member for withstanding a jack-up load, separately from a main body portion.

An object of an aspect of the present invention is to provide a sub-frame having a rational structure which can support a torque rod and can withstand a jack-up load.

A sub-frame according to a first aspect of the present invention includes: a main body portion that has a vehicle body support portion supported by a vehicle body; and a reinforcement plate that is attached to a bottom surface of the main body portion. The main body portion includes a torque rod support portion which supports a torque rod coupled to a power unit. The torque rod support portion has a first shaft support portion which supports one end of a shaft supporting the torque rod, a first opening portion into which the torque rod is able to be inserted, and a second opening portion which is formed below the first shaft support portion. The reinforcement plate has a second shaft support portion supporting another end of the shaft and covers the second opening portion from below.

According to this constitution, the torque rod support portion has the first shaft support portion which supports one end of the shaft supporting the torque rod, the first opening portion to which the torque rod is able to be inserted, and the second opening portion which is formed below the first shaft support portion. Further, the reinforcement plate has the second shaft support portion supporting the other end of the shaft and covers the second opening portion from below. Thus, the other end of the shaft is caused to be supported by the reinforcement plate instead of being supported by the main body portion. Accordingly, the reinforcement plate can have both a function of supporting the other end of the shaft which constitutes a hinge for supporting the torque rod and a function of reinforcement in which a concentrated load is prevented from directly acting on the main body portion by dispersing a received jack-up load in the main body portion. In addition, since the second opening portion is provided in the main body portion, the sub-frame can be reduced in weight. Moreover, since the second opening portion is located below the first shaft support portion, when the sub-frame is manufactured, a first die for forming a lower surface of the first shaft support portion can be moved forward and rearward through an opening of the second opening portion so that die-casting forming of the sub-frame can be facilitated. Thus, the sub-frame can have a rational structure which can support the torque rod and can withstand a jack-up load.

In a second aspect, the first opening portion may overlap the second opening portion in a plan view.

According to this constitution, the first opening portion overlaps the second opening portion in a plan view. Accordingly, a second die for forming the first opening portion can be moved forward and rearward in an upward-downward direction, for example, such that they pass by each other in a parallel manner with no gap between the second die and the first die for forming the lower surface of the first shaft support portion. Thus, die-casting forming of the sub-frame can be facilitated.

In a third aspect, the torque rod support portion may have a top plate in which the first shaft support portion is provided and which is integrally formed with the main body portion. The top plate may include a transverse rib which continuously extends to the vehicle body support portion.

According to this constitution, the torque rod support portion has the top plate in which the first shaft support portion is provided and which is integrally formed with the main body portion. The top plate includes the transverse rib which continuously extends to the vehicle body support portion. Accordingly, the rigidity of the torque rod support portion including the top plate can be enhanced, the torque rod can be reliably supported, and the rigidity of the sub-frame can be enhanced.

In a fourth aspect, the top plate may include a forward-rearward rib which extends in a forward-rearward direction.

According to this constitution, the top plate includes the forward-rearward rib which extends in the forward-rearward direction. Accordingly, the rigidity of the torque rod support portion including the top plate can be enhanced, and the torque rod can be reliably supported.

In a fifth aspect, the first shaft support portion may have a boss. The transverse rib may be coupled to the boss.

According to this constitution, the first shaft support portion has the boss. The transverse rib is coupled to the boss. Accordingly, the shaft can be firmly supported, and the top plate can be reinforced.

According to an aspect of the present invention, it is possible to provide a sub-frame having a rational structure which can support a torque rod and can withstand a jack-up load.

DESCRIPTION OF EMBODIMENTS

Figure 1:
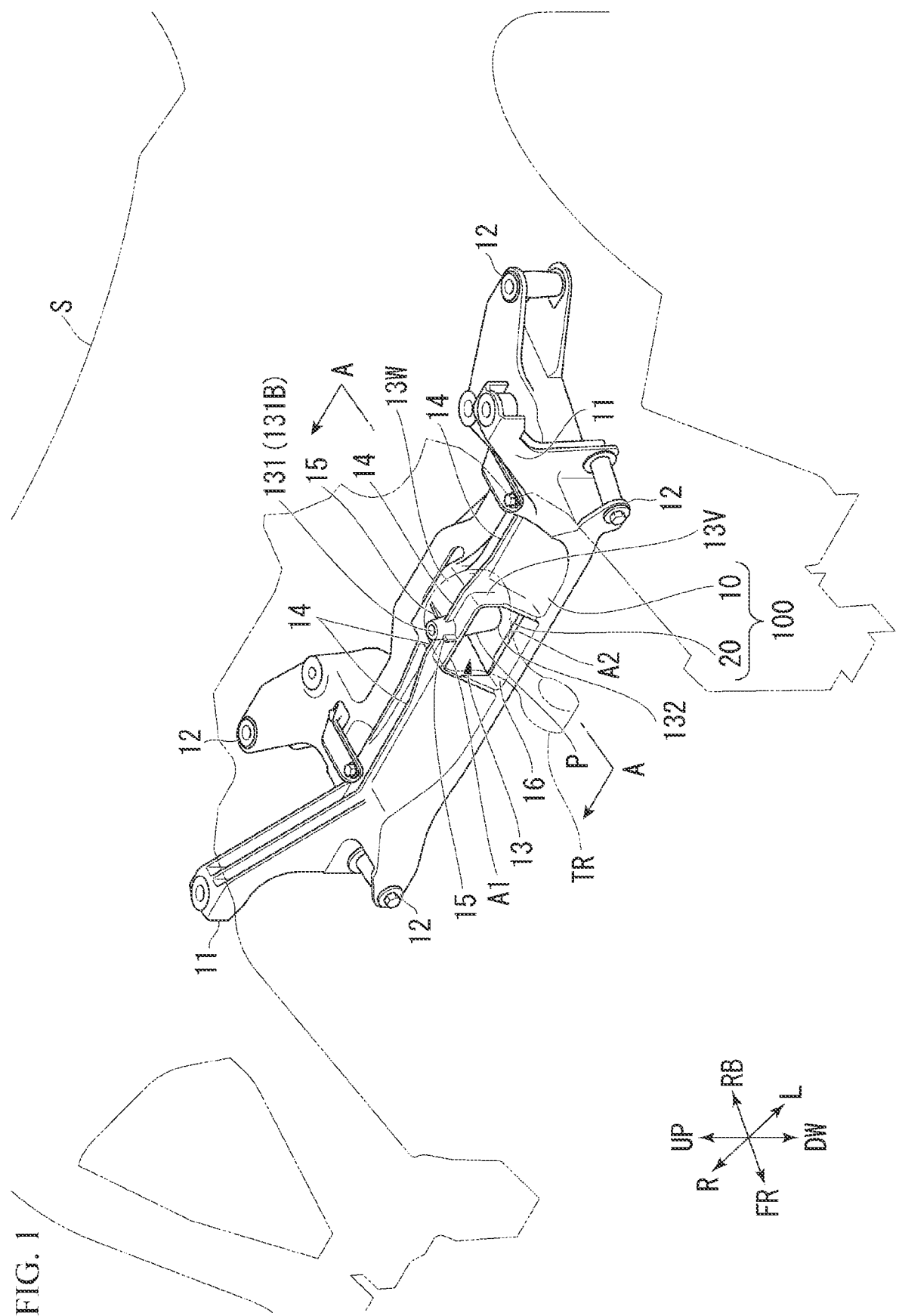
FIG. 1 is a perspective view of a sub-frame in an embodiment according to the present invention viewed from above.

Hereinafter, with reference to the drawings, a sub-frame 100 according to an embodiment of the present invention will be described. In the drawings, the arrow FR indicates a side in front of a vehicle, the arrow RB indicates a side behind the vehicle, the arrow UP indicates a side above the vehicle, the arrow DW indicates a side below the vehicle, the arrow L indicates the left side of the vehicle, and the arrow R indicates the right side of the vehicle. A leftward-rightward direction in the vehicle may be referred to as a vehicle width direction. The sub-frame 100 has substantially a bilaterally symmetrical structure.

Thus, hereinafter, the same reference signs may be applied to constituent members on the left and right sides in description.

Figure 2:
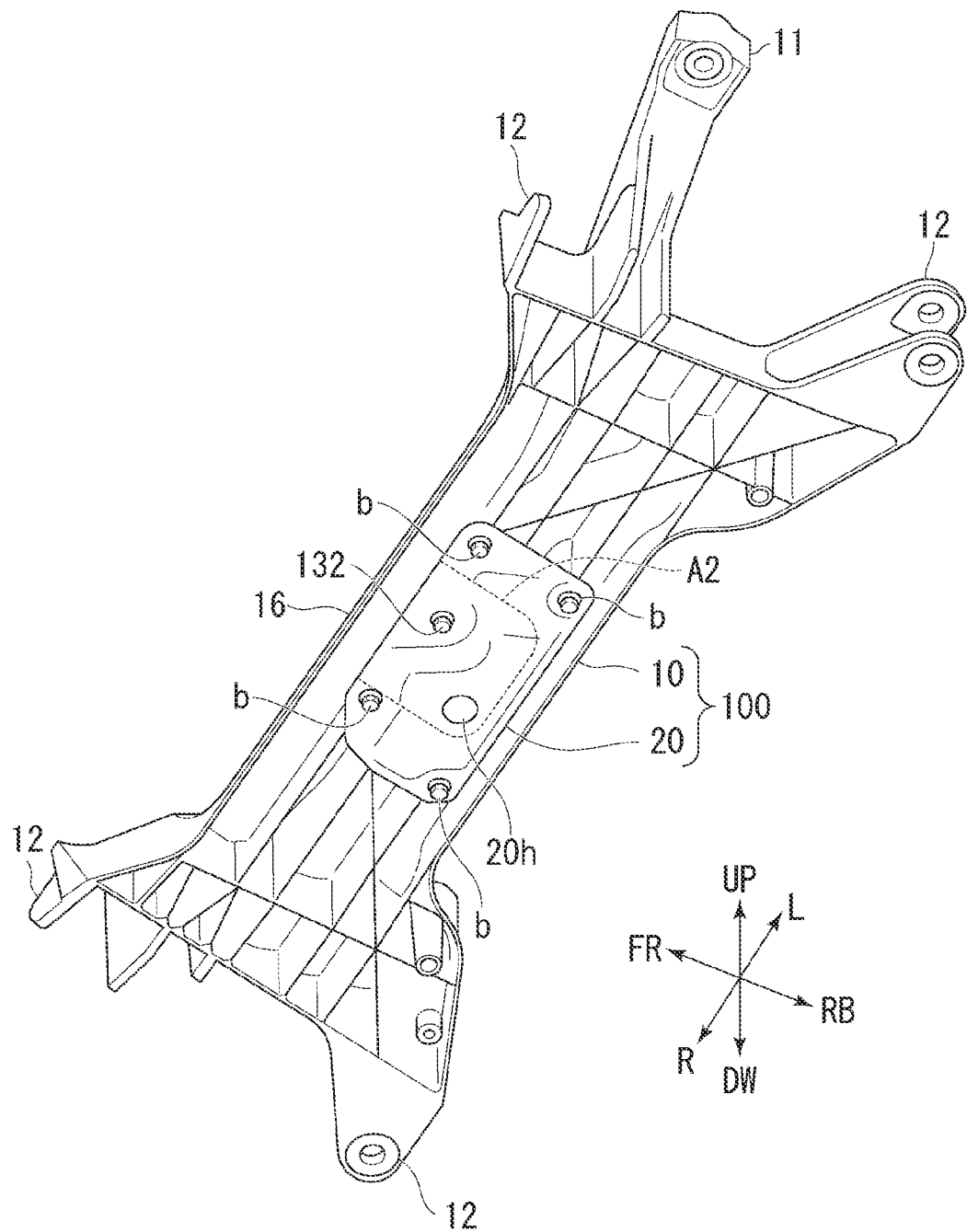
FIG. 2 is a perspective view of the sub-frame in the embodiment viewed from below.
Figure 3:
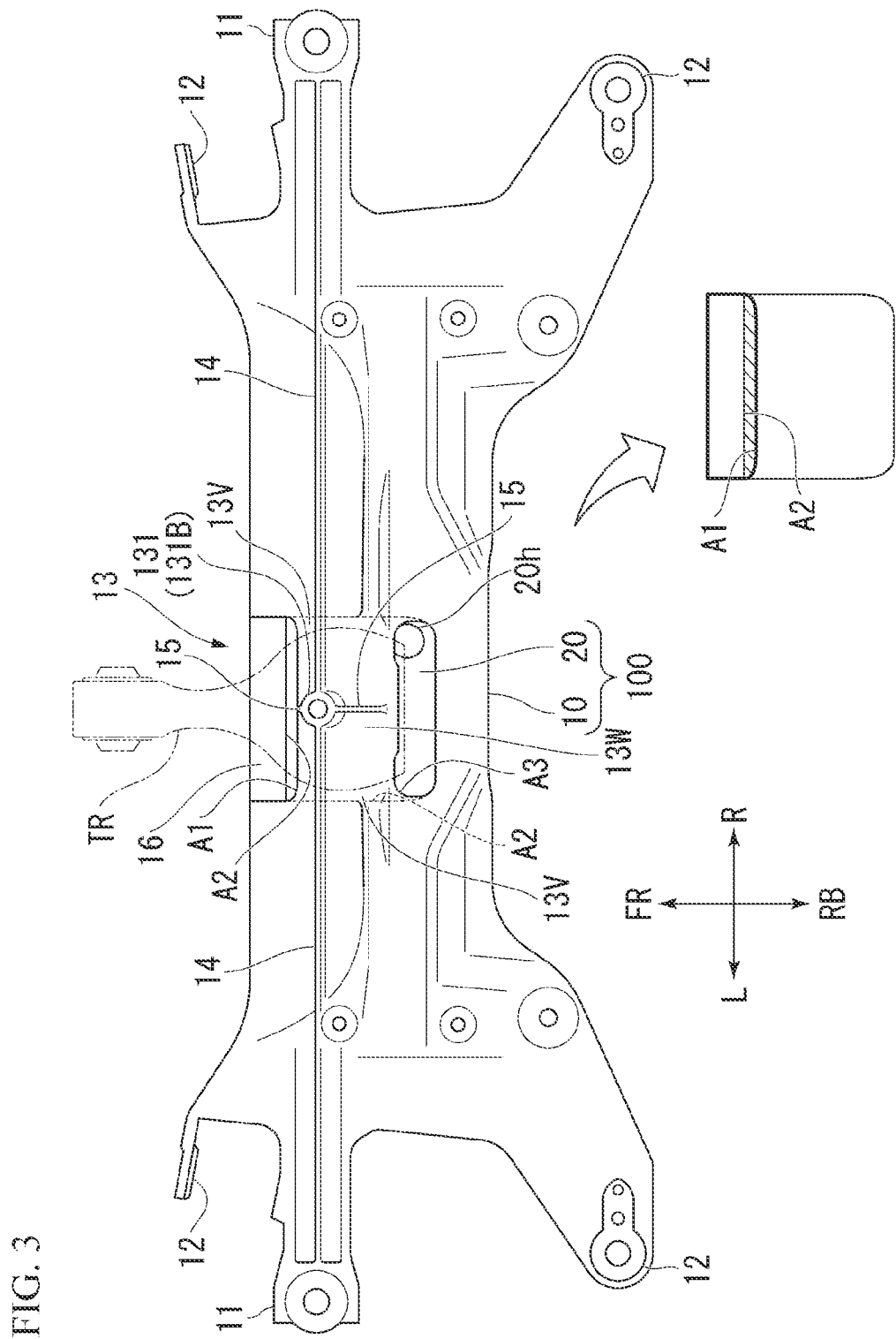
FIG. 3 is a plan view of the sub-frame in the embodiment.
Figure 4:
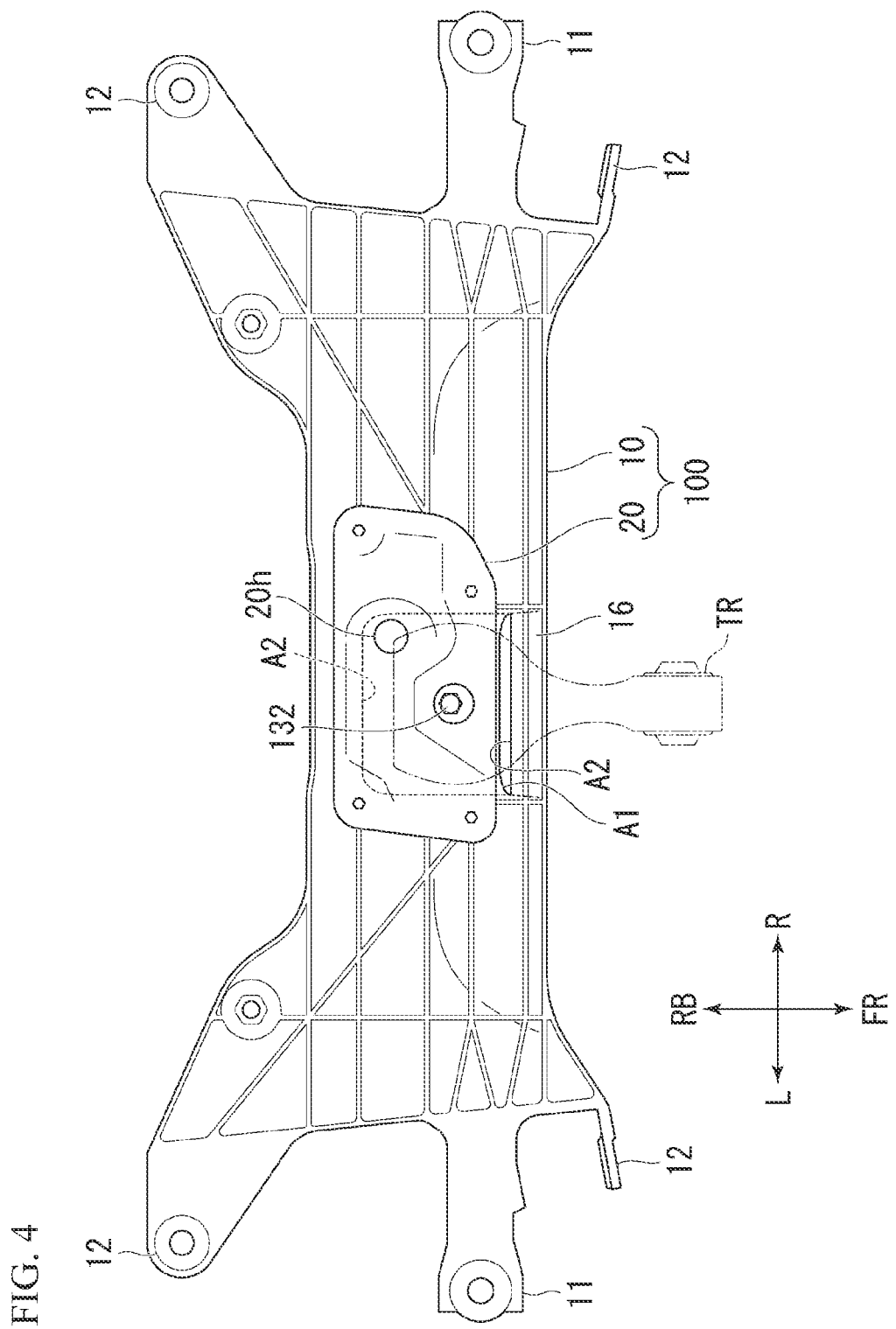
FIG. 4 is a bottom view of the sub-frame in the embodiment.
Figure 5:
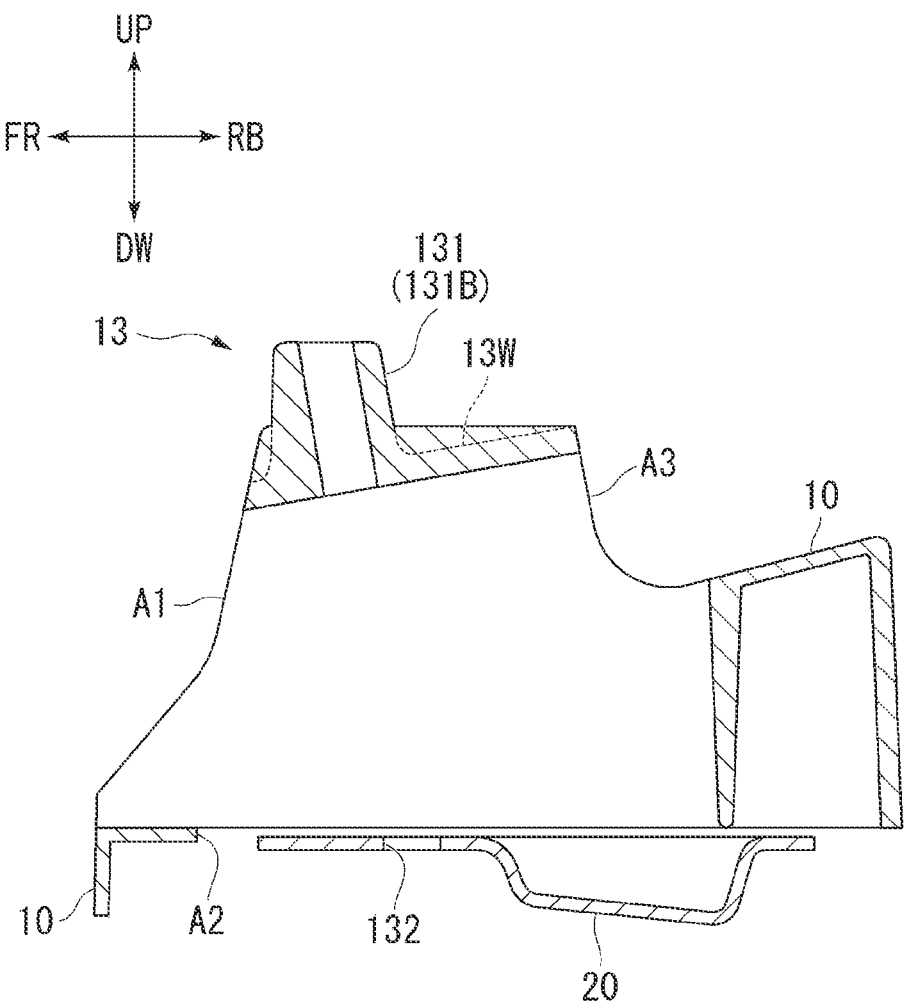
FIG. 5 is a cross-sectional view along arrow A in FIG. 1.

FIG. 1 is a perspective view of the sub-frame 100 in the embodiment according to the invention viewed from above. FIG. 2 is a perspective view of the sub-frame 100 in the embodiment viewed from below. FIG. 3 is a plan view of the sub-frame 100 in the embodiment. FIG. 4 is a bottom view of the sub-frame 100 in the embodiment. FIG. 5 is a cross-sectional view along arrow A in FIG. 1.

As illustrated in FIGS. 1 to 5, the sub-frame 100 is a member constituting part of a skeleton of the vehicle together with a vehicle body S and is provided below the vehicle body S.

The sub-frame 100 includes a main body portion 10 which extends in the vehicle width direction, and a reinforcement plate 20 which is attached to a bottom surface of the main body portion 10. For example, the main body portion 10 is made of an alloy of non-ferrous metal such as aluminum. For example, the reinforcement plate 20 is made of steel.

(Main Body Portion)

The main body portion 10 includes vehicle body support portions 11 which are supported by the vehicle body S, suspension arm support portions 12, and a torque rod support portion 13. In addition, the main body portion 10 suitably supports a steering case, a stabilizer, and the like (not illustrated) which are disposed in a space between the main body portion 10 and the vehicle body S.

A pair of vehicle body support portions 11 are disposed in the sub-frame 100 such that they are separated from each other in the vehicle width direction. The vehicle body support portions 11 extend upward. The vehicle body support portions 11 are parts for attaching the sub-frame 100 to the vehicle body S. The vehicle body support portions 11 support the sub-frame 100 across the vehicle body S in the vehicle width direction in a state in which a space is formed between the vehicle body S and the main body portion 10. The sub-frame 100 may have a plurality of pairs of left and right vehicle body support portions 11 without being limited to one pair.

The suspension arm support portions 12 support suspension arms (not illustrated) using hinges.

<Torque Rod Support Portion>

The torque rod support portion 13 supports a torque rod TR coupled to a power unit (not illustrated). One end of the torque rod TR is coupled to the sub-frame 100 via a bush (not illustrated) using a hinge. The other end of the torque rod TR is coupled to the power unit such as an engine.

Specifically, the torque rod support portion 13 has a first shaft support portion 131 which supports one end of a shaft P supporting the torque rod TR, a first opening portion A1 to which the torque rod TR is able to be inserted, and a second opening portion A2 which is formed below the first shaft support portion 131. The shaft P constitutes a hinge for swingably supporting the torque rod TR.

Here, the reinforcement plate 20 has a second shaft support portion 132 supporting the other end of the shaft P and covers the second opening portion A2 from below.

In this manner, the other end of the shaft P is caused to be supported by the reinforcement plate 20 instead of being supported by the main body portion 10. Accordingly, the reinforcement plate 20 can have both a function of supporting the other end of the shaft P which constitutes a hinge for supporting the torque rod TR and a function of reinforcement in which a concentrated load is prevented from directly acting on the main body portion 10 by dispersing a received jack-up load in the main body portion 10. In addition, since the second opening portion A2 is provided in the main body portion 10, the sub-frame 100 can be reduced in weight. Moreover, since the second opening portion A2 is located below the first shaft support portion 131, when the sub-frame 100 is manufactured, a first die (not illustrated) for forming a lower surface of the first shaft support portion 131 can be moved forward and rearward in an upward-downward direction through the second opening portion A2 without using a die sliding in a transverse direction, and die-casting forming of the sub-frame 100 can be facilitated.

Thus, the sub-frame 100 can have a rational structure which can support the torque rod TR and can withstand a jack-up load.

In addition, as illustrated in FIG. 3, the first opening portion A1 overlaps the second opening portion A2 in a plan view. In FIG. 3, the first opening portion A1 and the second opening portion A2 are extracted in simulation for illustration of the relationship therebetween. Here, hatching indicates an overlap of the first opening portion A1 and the second opening portion A2. In this manner, since the first opening portion A1 overlaps the second opening portion A2 in a plan view, a second die for forming the first opening portion A1 can be moved forward and rearward in the upward-downward direction, for example, such that they pass by each other in a parallel manner with no gap between the second die and the first die for forming the lower surface of the first shaft support portion 131. Thus, die-casting forming of the sub-frame 100 can be facilitated.

In addition to the first opening portion A1 and the second opening portion A2, the torque rod support portion 13 may have a third opening portion A3. Accordingly, the sub-frame 100 can be reduced in weight.

The torque rod support portion 13 has a top plate 13W which is integrally formed with the main body portion 10. The first shaft support portion 131 is provided in the top plate 13W.

Specifically, the top plate 13W is a plate-shaped body having substantially a horizontal surface along an upper surface of the main body portion 10. The top plate 13W is positioned above the upper surface of the main body portion 10. The top plate 13W has a space which can accommodate the torque rod TR therebelow. The top plate 13W is integrally formed with the main body portion 10 via a side plate 13V extending upward from the main body portion 10. The top plate 13W has the first shaft support portion 131 substantially at the center in a plan view. The top plate 13W is adjacent to the first opening portion A1 in front thereof. The top plate 13W is suitably adjacent to the third opening portion A3 behind it. The reinforcement plate 20 is provided below the top plate 13W at a distance from the space accommodating the torque rod TR and the second opening portion A2. The first shaft support portion 131 provided in the top plate 13W supports the one end of the shaft P. The second shaft support portion 132 provided in the reinforcement plate 20 supports the other end of the shaft P.

The first shaft support portion 131 may have a boss 131B. The boss 131B is joined to the one end of the shaft P and protrudes upward from an upper surface of the top plate 13W. For example, the boss 131B is a hollow tubular member. The boss 131B is provided substantially at the center of the top plate 13W. A transverse rib 14 can be preferably connected to the boss 131B. Accordingly, the shaft P can be firmly supported, and the top plate 13W can be reinforced.

Here, the top plate 13W may include the transverse rib 14 continuously extending to the vehicle body support portions 11. The transverse rib 14 is a protrusion which linearly lies in the vehicle width direction and extends upward. The transverse rib may be a single projection or a plurality of parallel projections.

In this manner, since the top plate 13W includes the transverse rib 14 continuously extending to the vehicle body support portions 11, the rigidity of the torque rod support portion 13 including the top plate 13W can be enhanced, the torque rod TR can be reliably supported, and the rigidity of the sub-frame 100 can be enhanced. When the sub-frame 100 has a plurality of pairs of left and right vehicle body support portions 11, the top plate 13W may have the transverse rib 14 continuously extending to each pair of left and right vehicle body support portions 11.

In addition, the top plate 13W may include a forward-rearward rib 15 extending in a forward-rearward direction. The forward-rearward rib 15 is a protrusion which linearly continuously extends in the forward-rearward direction and extends upward. The forward-rearward rib 15 may be a single projection or a plurality of parallel projections. The forward-rearward rib 15 can be preferably coupled to the boss 131B provided substantially at the center of the top plate 13W.

In this manner, since the top plate 13W includes the forward-rearward rib 15 extending in the forward-rearward direction, the rigidity of the torque rod support portion 13 including the top plate 13W can be enhanced, and the torque rod TR can be reliably supported.

In front of the first opening portion A1 and the second opening portion A2, the sub-frame 100 can preferably have a coupling body 16 extending in the vehicle width direction. Accordingly, the rigidity of the torque rod support portion 13 can be enhanced, and the torque rod TR can be reliably supported.

(Reinforcement Plate)

The reinforcement plate 20 is a plate-shaped body having a small thickness in the upward-downward direction compared to the dimension in the forward-rearward direction and the dimension in the vehicle width direction. The reinforcement plate 20 is fixed to the bottom surface of the main body portion 10 in a state in which the second opening portion A2 provided in the main body portion 10 is covered from below. For example, four corners of the reinforcement plate 20 are fixed at four places on the bottom surface of the main body portion 10 using fixing tools b such as bolts. The reinforcement plate 20 suitably has a drain hole 20h at the lowermost place in a vertical direction. Therefore, when it is desired to lift up the sub-frame 100 through jacking up using a jack (not illustrated), a jack-up load can act on the main body portion 10 in a dispersed manner via the reinforcement plate 20 by directly bringing the jack into contact with a bottom surface of the reinforcement plate 20 without causing a concentrated jack-up load to act thereon by directly bringing the jack into contact with the bottom surface of the main body portion 10.

In addition, the reinforcement plate 20 has the second shaft support portion 132 which supports the other end of the shaft P supporting the torque rod TR via the bush. The second shaft support portion 132 faces the first shaft support portion 131 provided in the top plate 13W thereabove. Further, the shaft P is supported in a state of lying across between the first shaft support portion 131 and the second shaft support portion 132.

Therefore, an input such as a load or vibration acting on the torque rod TR is propagated to the shaft P and is propagated to the first shaft support portion 131 of the top plate 13W and the second shaft support portion 132 of the reinforcement plate 20. Further, an input such as a load or vibration acting on the torque rod TR is propagated to the main body portion 10 from the top plate 13W and the reinforcement plate 20 in a dispersed manner.

In this manner, since the reinforcement plate 20 has both a function of dispersing a received jack-up load in the main body portion 10 of the sub-frame 100 and a function of supporting the torque rod TR, the sub-frame 100 can have a rational structure.

The technical scope of the present invention is not limited to the foregoing embodiment, and various changes can be applied within a range not departing from the gist of the present invention.

Furthermore, within a range not departing from the gist of the present invention, the constituent elements in the foregoing embodiment can be suitably replaced with known constituent elements. In addition, the foregoing modification example may be suitably combined.

What is claimed is:

1. A sub-frame comprising:
a main body portion that has a vehicle body support portion supported by a vehicle body; and
a reinforcement plate that is attached to a bottom surface of the main body portion,
wherein the main body portion includes a torque rod support portion which supports a torque rod coupled to a power unit,
wherein the torque rod support portion has a first shaft support portion which supports one end of a shaft supporting the torque rod, a first opening portion into which the torque rod is able to be inserted, and a second opening portion which is formed below the first shaft support portion, and
wherein the reinforcement plate has a second shaft support portion supporting another end of the shaft and covers the second opening portion from below.

2. The sub-frame according to claim 1,
wherein the first opening portion overlaps the second opening portion in a plan view.

3. The sub-frame according to claim 1,
wherein the torque rod support portion has a top plate in which the first shaft support portion is provided and which is integrally formed with the main body portion, and
wherein the top plate includes a transverse rib which continuously extends to the vehicle body support portion.

4. The sub-frame according to claim 2,
wherein the torque rod support portion has a top plate in which the first shaft support portion is provided and which is integrally formed with the main body portion, and
wherein the top plate includes a transverse rib which continuously extends to the vehicle body support portion.

5. The sub-frame according to claim 3,
wherein the top plate includes a forward-rearward rib which extends in a forward-rearward direction.

6. The sub-frame according to claim 4,
wherein the top plate includes a forward-rearward rib which extends in a forward-rearward direction.

7. The sub-frame according to claim 3,
wherein the first shaft support portion has a boss, and
wherein the transverse rib is coupled to the boss.

8. The sub-frame according to claim 4,
wherein the first shaft support portion has a boss, and
wherein the transverse rib is coupled to the boss.

9. The sub-frame according to claim 5,
wherein the first shaft support portion has a boss, and
wherein the transverse rib is coupled to the boss.

10. The sub-frame according to claim 6,
wherein the first shaft support portion has a boss, and
wherein the transverse rib is coupled to the boss.

\* \* \* \* \*